United States Patent [19]
Smith

[11] Patent Number: 5,848,840
[45] Date of Patent: Dec. 15, 1998

[54] EMERGENCY FOG LENS DEVICE

[76] Inventor: Norvin R. Smith, 11204 Treloar Rd., Memphis, Ind. 47143

[21] Appl. No.: 883,613

[22] Filed: Jun. 26, 1997

[51] Int. Cl.[6] .............................. F21L 15/16; B60Q 1/00; F21M 3/14; F21V 9/00
[52] U.S. Cl. ........................... 362/397; 362/61; 362/255; 362/293
[58] Field of Search ............................. 362/61, 255, 293, 362/397

[56] References Cited

U.S. PATENT DOCUMENTS

| | | | |
|---|---|---|---|
| 1,814,034 | 7/1931 | Hartman | 362/397 |
| 2,227,541 | 1/1941 | Groff | 362/397 |
| 2,319,726 | 5/1943 | Duggan | 362/397 |
| 2,675,983 | 4/1954 | King | 362/397 |
| 2,785,291 | 3/1957 | Bernstein | 240/46.57 |
| 4,439,817 | 3/1984 | Aton | 362/255 |
| 5,143,443 | 9/1992 | Madsen | 362/255 |
| 5,169,228 | 12/1992 | Breitzler | 362/293 |
| 5,180,224 | 1/1993 | Svehaug | 362/255 |

FOREIGN PATENT DOCUMENTS 2644737  9/1990  France ................................. 362/397

*Primary Examiner*—Sandra L. O'Shea
*Assistant Examiner*—Matthew J. Spark
*Attorney, Agent, or Firm*—Henderson & Sturm

[57] ABSTRACT

An emergency fog lens device 10 for use with conventional clear headlights 101 of a vehicle 100. The device 10 includes an enlarged generally rectangular tinted lens member 20 provided with a plurality of spaced rows of apertures 22 dimensioned to receive a plurality of securing elements 40 which engage a like plurality of suction cup members 30 for releasably securing the lens member 20 to a vehicle headlight 101.

3 Claims, 1 Drawing Sheet

EMERGENCY FOG LENS DEVICE

BACKGROUND OF THE INVENTION

1. Field of the Invention

The present invention relates to the field of fog lenses in general, and in particular to removable fog lens arrangements.

2. Description of Related Art

As can be seen by reference to the following U.S. Pat. Nos. 2,785,291; 4,439,817; 5,143,443; and 5,180,224, the prior art is replete with myriad and diverse removable fog lens arrangements.

While all of the aforementioned prior art constructions are more than adequate for the basic purpose and function for which they have been specifically designed, they are uniformly deficient with respect to their failure to provide a simple, efficient, and generally one size fits all type fog lens device that may be installed on a variety of different sized clear transparent lens covers, as opposed to the customized fog lens arrangements that are characterized by their prior art patents.

As anyone who has purchased the prior art lens covers is all too painfully aware, they are dimensioned to fit a specific sized lens, difficult to install and/or occupy too much space when not in use.

As a consequence of the foregoing situation, there has existed a longstanding need for a new and improved fog lens device that may be removably installed on a wide variety of different shaped clear transparent headlight lens covers and the provision of such a constructions is a stated objective of the present invention.

BRIEF SUMMARY OF THE INVENTION

Briefly stated, the emergency fog lens device that forms the basis of the present invention comprises in general, an elongated rectangular lens member provided with a plurality of diametrically opposed spaced apertures which extend inwardly from each of the corners of the rectangular lens member and suction cup mounting members associated with the selected apertures for securing the lens member to a conventional clear transparent headlight lens.

As will be explained in greater detail further on in the specification, the suction cup mounting members are also provided with fastening elements which are dimensioned to pass through the selected apertures to operatively secure the lens member to the suction cup mounting members.

In addition, the positioning and spacing of the apertures in the lens member virtually guarantees that the emergency fog lens device of this invention can be temporarily fitted to almost any conventional clear headlight lens construction.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
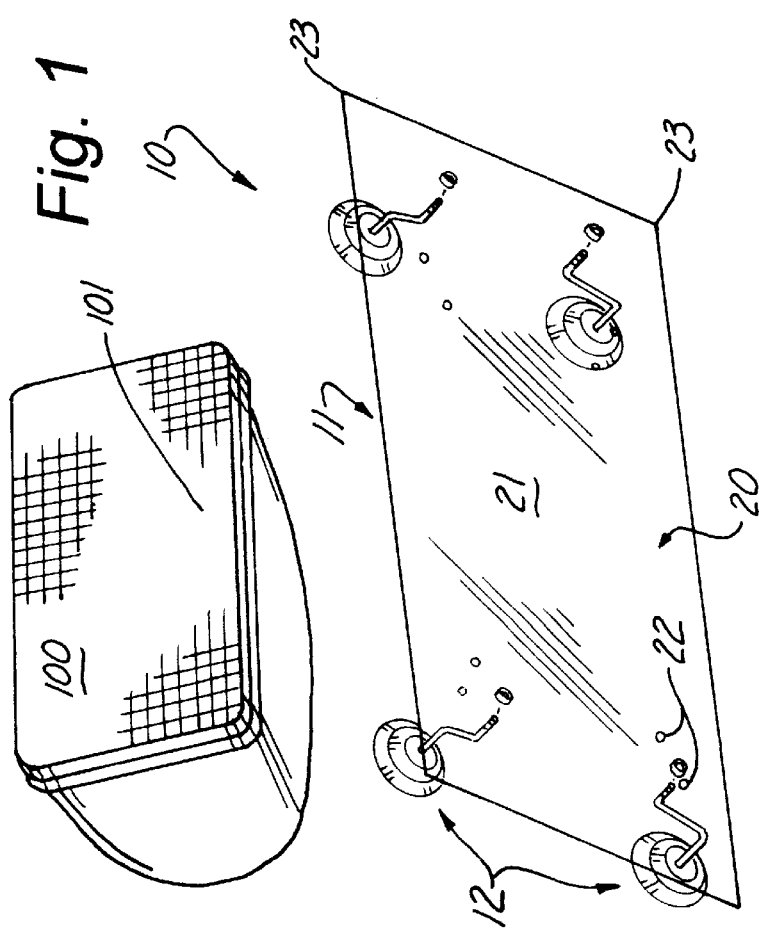
FIG. 1 is an exploded perspective view of the emergency fog lens device and a conventional clear vehicle headlight lens.

As can be seen by reference to the drawings, and in particularly to FIG. 1, the emergency fog lens device that forms the basis of the present invention is designated generally by the reference number 10. The fog lens device 10 comprises in general, a lens unit 11, and a plurality of mounting units 12. These units will now be described in seriatim fashion.

Figure 2:
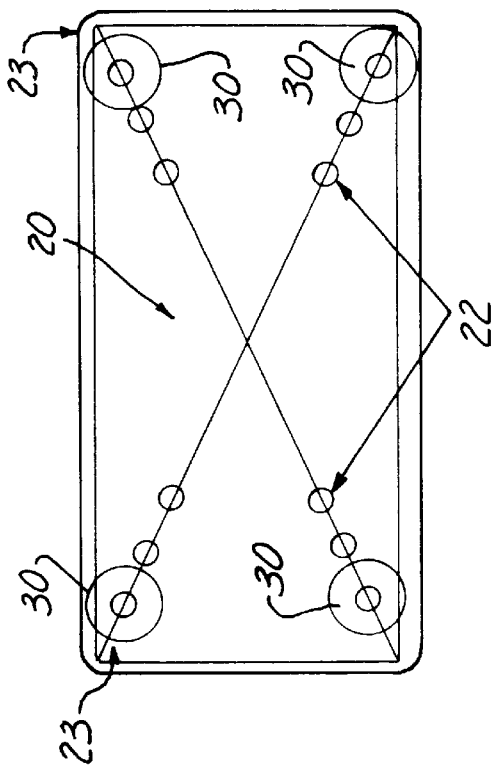
FIG. 2 is a front plan view of the emergency fog lens device.

As can best be seen by reference to FIGS. 1 and 2, the lens unit 11 comprises in general an elongated rectangular lens member 20 fabricated from a sheet of generally flexible tinted plastic material 21 colored deep yellow or amber for their well recognized fog penetrating properties.

As can also be seen by reference to FIGS. 1 and 2, the lens member 20 is dimensioned to overlie a conventional clear headlight lens 100 of a vehicle. In addition, the lens member 20 is provided with a plurality of diametrically aligned spaced rows of apertures 22 which extend inwardly from each of the corners 23 of the generally rectangular lens member 20.

Still referring to FIGS. 1 and 2, it can be seen that the apertures 22 are dimensioned to receive a portion of the mounting units 12 for operatively and removably attaching the lens member 20 to the normally clear headlight lens 100 of a vehicle.

Figure 4:
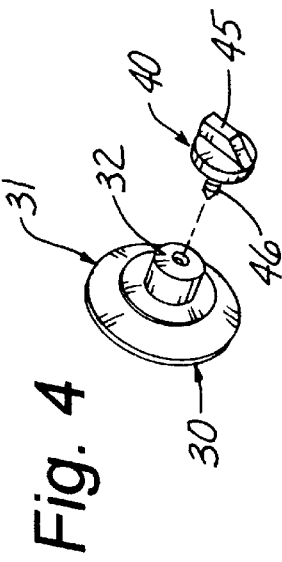
FIG. 4 is an isolated perspective view of another version of the mounting elements.
Figure 3:
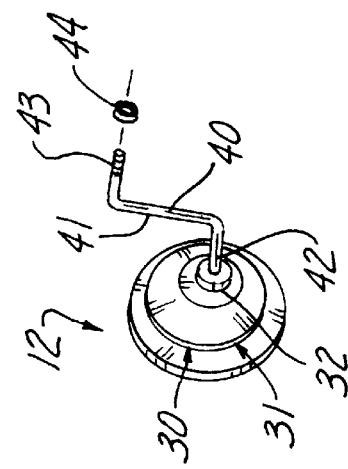
FIG. 3 is an isolated perspective view of one version of the mounting elements employed in conjunction with the invention.

As shown in FIGS. 3 and 4, the mounting units 12 comprise in general, a plurality of suction cup members 30 having a cup port on 31 and a stem portion 32. The cup portion 31 is designed to engage the vehicle headlight lens 101 and the stem portion 32 is designed to be operatively engaged with a selected aperture 22 on the lens member 20 for securing the lens member 20 to the vehicle headlight 100 by a securing element designated generally as 40.

In one version of the preferred embodiment depicted in FIG. 3, the securing element 40 comprises a generally S-shaped swivel arm 41, having an inboard end 42 dimensioned to pass through the apertures 22 in the lens member 20 and be received in the stem portion 32 of the suction cup member 30. In addition, the outboard end 43 of the swivel arm 41 is threaded and dimensioned to receive a locking nut 44 to prevent the swivel arm 41 from becoming detached from the lens member 20.

In the other version of the preferred embodiment depicted in FIG. 4, the securing element 40 comprises an enlarged cap 45 having a threaded stem portion 46 which is dimensioned and intended to pass through the apertures 22 in the lens member 20 and threadably engage the stem portion 32 of the suction cup member 30.

At this juncture, it should be noted that while two preferred versions of the securing element 40 have been described herein, it is to be understood that this invention is not to be limited thereby and other suitable securing elements 40 and securing arrangements may be substituted therefor.

It should also be noted that by virtue of the number and spacing of the apertures 22, the suction cup members 30 may be arrayed at a variety of locations relative to the lens member 20 as to secure the lens member 20 to a variety of different sized and configured vehicle headlight lenses 101 thereby making the emergency lens device 10 almost universally adapted to all vehicle makes, models, and types.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures

I claim:

1. An emergency fog lens device for use with conventional clear headlights on vehicles wherein the fog lens device consists of:

an enlarged lens member fabricated from a generally rectangular sheet of tinted plastic material having a plurality of apertures aligned in spaced rows of diagonally opposed apertures that extend inwardly from the opposed corners of the generally rectangular lens member wherein each spaced row of apertures is diametrically aligned relative to one other spaced row of apertures;

a plurality of suction cup members operatively associated with a selected aperture in each of said plurality of spaced rows of apertures; and securing means for operatively connecting the plurality of suction cup members to the lens member.

2. The fog lens device as in claim 1 wherein said securing means comprises: a generally S-shaped arm having one end dimensioned to pass through said plurality of apertures to engage a portion of one of the plurality of suction cup members.

3. The fog lens device as in claim 1 wherein said securing means comprises: an enlarged cap having a threaded stem portion dimensioned to pass through said plurality of apertures to engage a portion of one of the plurality of suction cup members.

* * * * *